Oct. 6, 1936.  P. J. FITZGERALD  2,056,512
BASE MECHANISM FOR MIXING MACHINES
Filed Dec. 6, 1932    2 Sheets-Sheet 1
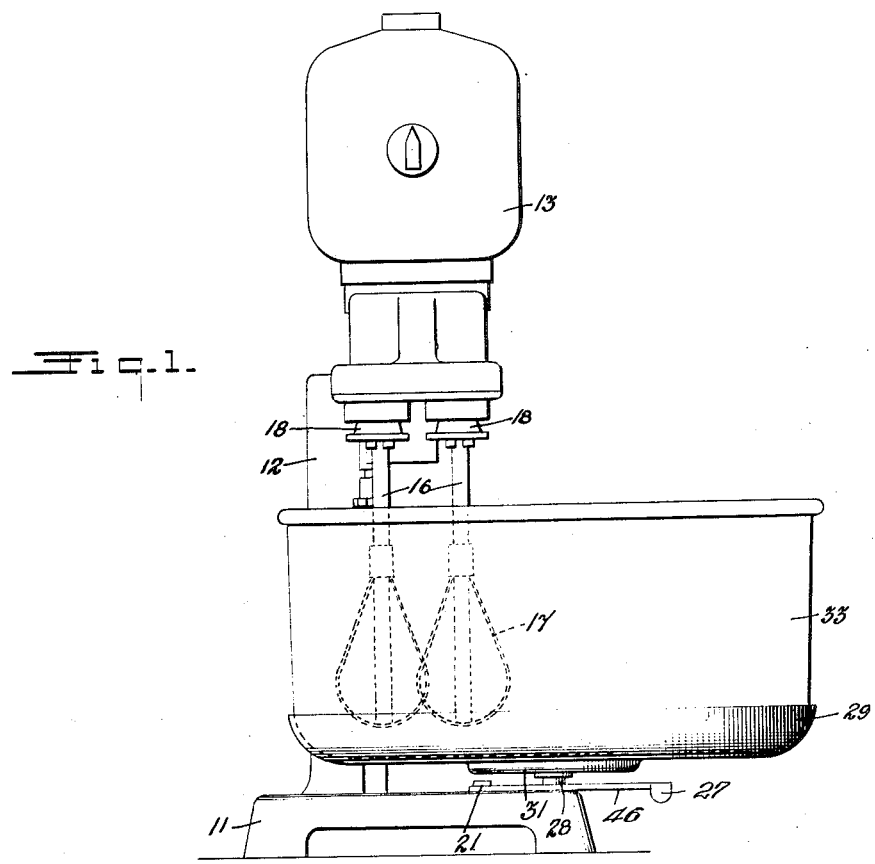
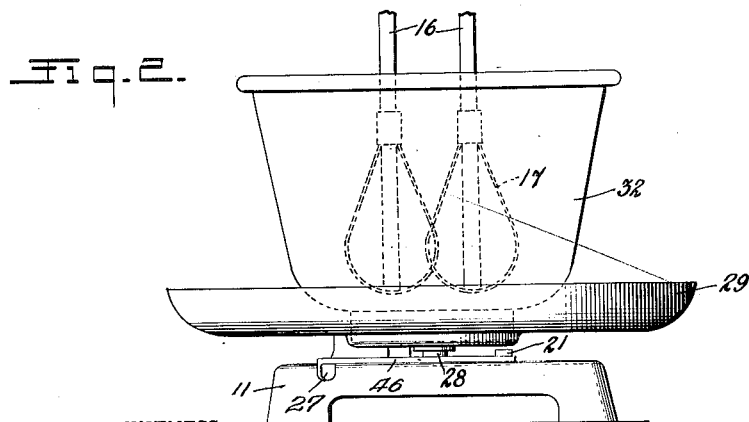
INVENTOR
Patrick J. Fitzgerald
BY
HIS ATTORNEY Oct. 6, 1936.                P. J. FITZGERALD                2,056,512
                     BASE MECHANISM FOR MIXING MACHINES
                          Filed Dec. 6, 1932          2 Sheets-Sheet 2

WITNESS:

INVENTOR
Patrick J. Fitzgerald
BY
HIS ATTORNEY

Patented Oct. 6, 1936

2,056,512

UNITED STATES PATENT OFFICE 2,056,512

BASE MECHANISM FOR MIXING MACHINES

Patrick J. Fitzgerald, Torrington, Conn., assignor to The Fitzgerald Mfg. Company, Torrington, Conn., a corporation of Connecticut Application December 6, 1932, Serial No. 645,932

2 Claims. (Cl. 259—84)

This invention relates to a mixing machine, and more particularly to a household mixing machine for use in mixing cake batters, fillings for pies, meringues, mayonnaise, etc.

The machine is especially adapted for using different sized vessels in which the mass to be mixed is placed, and which, from their very nature, are of vastly differing quantities, e. g. cake batters which would probably be of considerable bulk, and mayonnaise or salad dressings, which would likely be of considerably lesser amount, so that for effective mixing, it is necessary to use vessels which will give the required height therein of the material to be mixed.

With the use of a large vessel, it is preferable, in order to efficiently mix the mass, that the mixing implements should be so located as to work the material along the side of the vessel, while rotating the vessel, and for this purpose a turntable is provided for carrying or supporting the vessel.

It is self-evident that when the smaller vessel is used, it would be impossible to rotate it from the same center as that from which the larger vessel is rotated. Consequently, provision must be made for properly rotating different sized vessels.

One method providing these different centers of rotation has been suggested, and that is, to provide separate openings in the base of the machine for receiving the stud of the turntable so that when changing from one vessel to another, it is necessary to bodily remove the turntable from one location to another.

The present invention is designed and has for its object the elimination of the necessity of disturbing the rotating element or turntable, and to eliminate the necessity of changing its moorings.

According to the invention, the mixing machine which has a base and a laterally fixed motor propelled mixing implement, is provided with a lever having a hole intermediate its ends for the admission of the turntable stud, and said lever has its inner end pivoted to the base, whereby the table may be moved laterally to properly locate vessels of different sizes with respect to the mixing implement.

Figure 3:
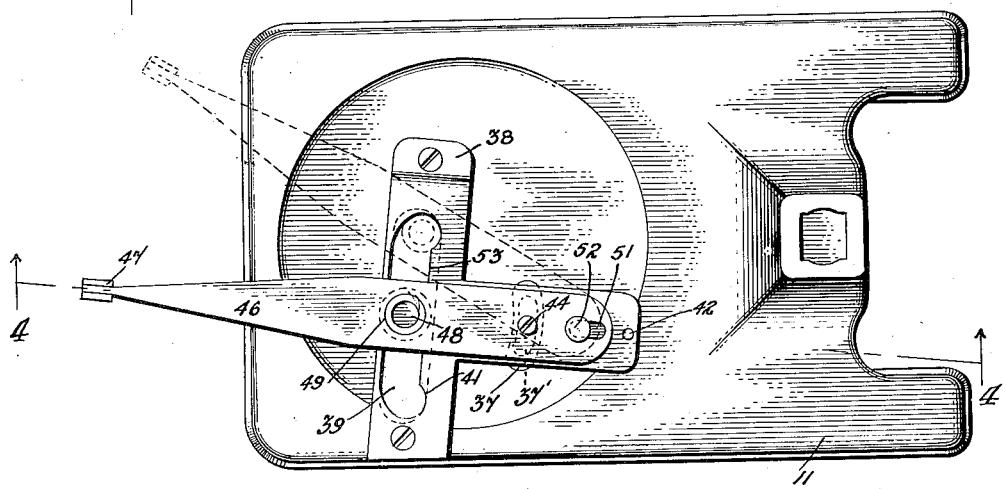
Figure 4:
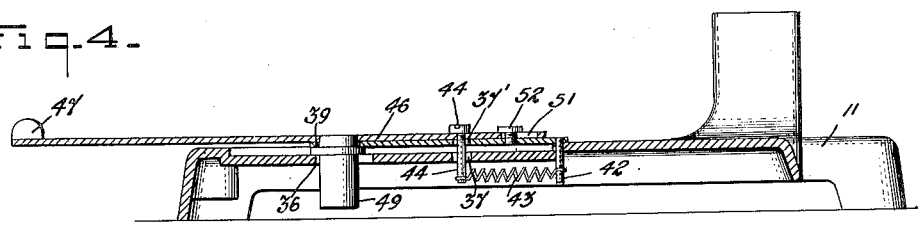
Figure 5:
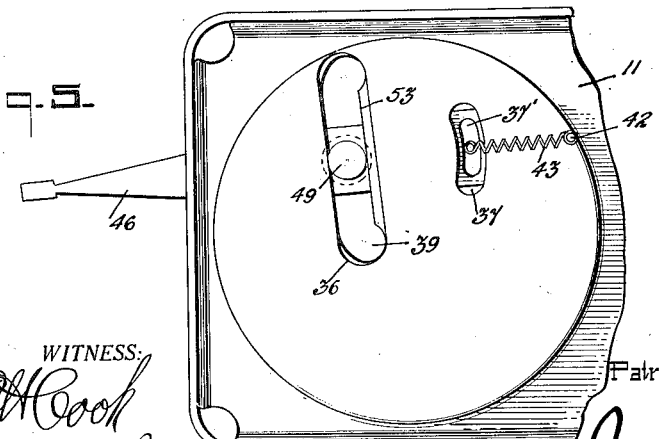

The drawings illustrate an embodiment of the invention, and the views therein are as follows:

Figure 1 is a front end view of a mixer with my invention incorporated therein, and showing the arrangement of parts when a large vessel is being used, Figure 2 is a fragmentary view of the same, showing the arrangement when a smaller vessel is being used, Figure 3 is a like view, showing another form of the invention, Figure 4 is a longitudinal sectional view taken on the line 4—4 of Figure 3, and Figure 5 is a fragmentary bottom plan view of the base shown in Figures 3 and 4.

The mixing machine per se forms no part of the present invention, and the invention herein is confined to the means and mehanisms for locating the different sized vessels on the base, as previously stated.

The mixing machine has a base 11 with a standard 12 on which a motor 13 is pivotally mounted. This motor has the usual speed changing gearing (not shown) for driving the stems 16 of the mixing implements 17, which stems are removably held by the chuck mechanisms 18.

While in the present drawings there has been shown a pair of mixing implements operating from a chuck head, it is not the intention to confine this invention to any specific number of mixing implements as one or a plurality may be employed.

Figures 1 and 2 serve to illustrate the use of different sized vessels, and it will be noted that in the former of these figures, where the larger vessel is used, it is essential that the working implements operate at or along one side of the vessel during its rotation, thereby effectually mixing and stirring the entire mass in the vessel.

It is also self-apparent that if a smaller vessel is rotated from the same center, the working or the mixing implements which are laterally fixed will not even enter the small vessel.

Referring now to Figure 4, a lever 19 is pivotally mounted at 21 on the base so that the outer end 22 extends over the edge of the base, and is provided with a thumb piece 23.

Figures 3, 4, and 5 show a modified form of lever mechanism, wherein the table has a cutout portion or slot 36 and a smaller slot 37. Extending above the slot 36 is a plate 38 which has a slot 39 with a recess 41 in each end of the same. This plate, which is T-shaped, has a leg which extends across the slot 37, and has a slot 37' directly over the same, and the inner end thereof is fastened to the base by a pin 42 which extends through the base and forms means for anchoring one end of a spiral spring 43 whose other end is fixed to a screw 44 which is fastened in the lever 46 and extends down through the slots 37' and 37. The lever 46 is pivotally mounted at 21 and is provided with a thumb piece 47 on its cuter end.

The lever 46 is provided with a hole 48 and ferrule 49. Received in the ferrule 49 is a stud 28 formed on a turntable 29 which has a depressed central portion 31. When a small vessel, such as that designated 32 in Figure 2, is mounted on the turntable 29, this vessel is received in the depressed center 31 while a larger vessel 33 occupies the entire turntable as shown in Figure 1. The inner end of the lever 46 is slotted, as at 51, and slidably mounted on the screw 52 secured in the leg of the T-shaped plate 38.

The lever 46 is movable within the limits of the slot 39 through which the ferrule 49 extends, and when the lever is moved to its extreme position, the spring 43 which constantly exerts a pull on the lever, will draw the same inward, so that the ferrule will drop into the recess 41 at the ends of the slot 39, as shown by the dotted lines in Figure 3.

Of course, other recesses may be placed in the edge 53 of the slot 39, if it is desired to provide fixed positions for vessels of intermediate size.

If desired, the T-shaped plate 38 may be eliminated and the casting built up and slotted.

Of course, the base mechanism illustrated may be modified and changed in various ways without departing from the invention herein set forth and hereafter claimed.

I claim:—

1. A mixing machine of the character described comprising a base formed with a slot therein, said slot having enlargements at each end thereof, a standard upstanding from the base and carrying a motor offset laterally therefrom at the upper end of the standard, a pair of vertical spindles rotatively driven by said motor and carrying beaters thereon, a lever pivotally mounted on said base and having its free end extending outwardly from said base to provide a handle for moving it, the pivotal mounting of said lever on the base consisting of a pin and slot connection, a ferrule on said lever extending into said slot and adapted to be received in the enlargement of either end thereof, a spring having one end anchored to said base and the other attached to the lever whereby the lever is actuated in the direction tending to yieldably maintain the ferrule in one of the enlargements at either end of the slot, a turntable having a flange for receiving and restraining a vessel, and a stud on the bottom of said turntable fitting into said ferrule, whereby the turntable is rotatably mounted on the lever and may be moved laterally to rotate the vessel with respect to the mixing implement during operation of the mixing machine.

2. A mixing machine of the character described comprising a base formed with a substantially straight slot having an enlarged portion at each end thereof, a standard upstanding from the base, a motor carried by the standard at the upper end thereof, mixing instrumentalities depending from the motor and disposed above the base, a lever pivotally mounted on the base by a sliding pivotal connection, said lever projecting beyond the base to provide a handle for moving the said lever, a ferrule on the lever extending into the slot, said base being formed with a slot intermediate the first mentioned slot and the sliding pivotal connection, a pin carried by the lever and extending through said intermediate slot, a spring having one end attached to said pin and the other end anchored to said base whereby the spring exerts a force on said lever tending to maintain the ferrule in one of the enlargements at either end of the first mentioned slot, a turntable having a flange for receiving and restraining a vessel, and a stud on the bottom of said turntable fitting into said ferrule, whereby the turntable is rotatably mounted on the lever and is movable laterally to rotate the vessel with respect to the mixing instrumentalities during operation of the mixing machine, and is maintained in such position by the spring and enlargements at the end of the slot.

PATRICK J. FITZGERALD.